(12) United States Patent
Nabesako et al.

(10) Patent No.: US 7,940,810 B2
(45) Date of Patent: May 10, 2011

(54) ENCODING/TRANSMITTING APPARATUS AND ENCODING/TRANSMITTING METHOD

(75) Inventors: Hideki Nabesako, Tokyo (JP); Keisuke Aoki, Tokyo (JP)

(73) Assignee: Sony Corporation (JP)

( * ) Notice: Subject to any disclaimer, the term of this patent is extended or adjusted under 35 U.S.C. 154(b) by 450 days.

(21) Appl. No.: 10/537,570

(22) PCT Filed: Dec. 5, 2003

(86) PCT No.: PCT/JP03/15628
§ 371 (c)(1),
(2), (4) Date: Jun. 3, 2005

(87) PCT Pub. No.: WO2004/054148
PCT Pub. Date: Jun. 24, 2004

(65) Prior Publication Data
US 2006/0023753 A1    Feb. 2, 2006

(30) Foreign Application Priority Data
Dec. 11, 2002    (JP) ................ P2002-359726

(51) Int. Cl.
*H04J 3/12*    (2006.01)
(52) U.S. Cl. ........................................... 370/528
(58) Field of Classification Search ............ 370/204, 370/478, 490, 528, 212; 379/93.08; 375/362
See application file for complete search history.

(56) References Cited

U.S. PATENT DOCUMENTS

| 5,566,208 A | 10/1996 | Balakrishnan |
| 5,859,846 A * | 1/1999 | Kim et al. ............. 370/395.62 |
| 7,187,844 B1 * | 3/2007 | Terao et al. ................. 386/56 |
| 2002/0150123 A1 | 10/2002 | Ro |

FOREIGN PATENT DOCUMENTS

| EP | 0 841 820 A2 | 5/1998 |
| JP | 11-317460 | 11/1999 |

* cited by examiner

*Primary Examiner* — Ricky Ngo
*Assistant Examiner* — Chandrahas Patel
(74) *Attorney, Agent, or Firm* — Lerner, David, Littenberg, Krumholz & Mentlik, LLP

(57) ABSTRACT

An encoding/transmitting apparatus that is used to transmit moving-picture data from a transmitting side to a receiving side through a transmission path and to subject the moving-picture data to streaming in the receiving side has an external-output request determining unit that monitors the state of a network. If the network assumes an undesirable state, the request determining unit causes a multiplex output unit to stop multiplexing data. When the network assumes a desirable state, the multiplex unit starts multiplexing the data again. A video encoding unit and an audio encoding unit keep encoding data, whether the multiplex output unit is multiplexing data or not. When the area occupied by encoded data in an encoded-video-data storage unit and the area occupied by encoded data in an encoded-audio-data storage unit exceed a predetermined value, the encoding units stop encoding data, and wait until the area occupied by encoded data sufficiently decreases.

15 Claims, 9 Drawing Sheets

ENCODING/TRANSMITTING APPARATUS AND ENCODING/TRANSMITTING METHOD

CROSS-REFERENCE TO RELATED APPLICATIONS

The present application is a national stage application under 35 U.S.C. §371 of International Application No. PCT/JP03/015628, filed Dec. 5, 2003, which claims priority from Japanese Application No. 2002-359726, filed Dec. 11, 2002, the disclosures of which are incorporated herein by reference.

BACKGROUND OF THE INVENTION

1. Technical Field

The present invention relates to an encoding/transmitting apparatus and an encoding/transmitting method. More particularly, the invention relates to an apparatus and method for transmitting coded data, which are fit for use in television-meeting systems, television-telephone systems, broadcasting systems and multi-media database systems in which moving picture data is transmitted from a transmitting side to a receiving side through a transmission path and subjected to real-time playback (streaming).

2. Background Art

In recent years, video-data converting methods are widely used in distributing data between the broadcasting stations and the households. These methods accomplish transmission and storage of data at high efficiency, by utilizing the redundancy inherent to video data when the video data is treated as digital data.

Among these video-data converting methods is an image-encoding method that is standardized by MPEG4 (Moving Picture Expert Group). This image-encoding method is defined in ISO/IEC 14496 and is used in various applications, from those for professional use to those for consumer use.

MPEG-4 is a system that compresses moving-picture data. The MPEG-4 standards provide a system for achieving real-time playback (hereinafter called "streaming") of moving-picture data, particularly in television-meeting systems, television-telephone systems, broadcasting systems and multi-media database systems. If data is encoded and transmitted in accordance with MPEG-4, the receiving-side system performs error correction and interleaving. Depending on the traffic condition in the transmission path, however, the packets are inevitably lost or the data inevitably has errors. To perform streaming on the network, it is, therefore, necessary to control the bit rate of the data to output and to control the amount of data passing through the transmission path.

FIG. 1 shows a conventional encoding/transmitting apparatus 100. As FIG. 1 shows, the encoding/transmitting apparatus 100 comprises a video encoding unit 101, an audio encoding unit 102, an encoded-video-data storage unit 103, an encoded-audio-data storage unit 104, and a multiplex output unit 106. The video encoding unit 101 encodes the input video data. The audio encoding unit 102 encodes the input audio data. The encoded-video-data storage unit 103 stores the video data encoded. The encoded-audio-data storage unit 104 stores the audio data encoded. The multiplex output unit 106 multiplexes the video data and the audio data, both encoded, and outputs them. The encoding/transmitting apparatus 100 further comprises a network-state determining unit 105. The network-state determining unit 105 receives information about packet loss, from the communication party. If the unit 105 determines that the load on the network is heavy, it controls the video encoding unit 101 and audio encoding unit 102 to lower the encoding bit rate.

Note that, in FIG. 1, the broken lines indicate the flow of data, and the solid lines indicate the flow of control signals.

Another method is available to control the encoding bit rate. This method is to lower the encoding bit rates of the video-data encoding unit and audio-data encoding unit, on the basis of the buffer-occupied storage areas in the data storage units. (See Japanese Patent Application Laid-Open Publication No. 11-41608.)

The encoding bit rates may be controlled in accordance with a response from the communication party. However, no response can hardly received from the communication party if congestion occurs on the network. In this case, the network-state determining unit cannot determine the state of the network. Consequently, the bit rates may not be appropriately controlled. Further, the bit rates cannot be controlled in accordance with the state of the network, by monitoring only the buffer-occupied storage areas.

SUMMARY OF THE INVENTION

An object of this invention is to provide a novel encoding/transmitting apparatus and a novel encoding/transmitting method, each capable of solving the problems with the prior art described above.

Another object of the invention is to provide an encoding/transmitting apparatus and an encoding/transmitting method, which perform an appropriate rate control even if the load on the transmission path increases.

An encoding/transmitting apparatus according to this invention comprises: an input means for inputting data; an encoding means for encoding the data input; a storage means for storing encoded data generated by the encoding means; a multiplexing means for multiplexing the encoded data stored in the storage means and transmitting the data multiplexed, to a predetermined receiving apparatus connected through a network, and a monitoring means for monitoring a state of the network. The multiplexing means controls a multiplexing rate in accordance with the state of the network, which the monitoring means has detected.

An encoding/transmitting method according to the invention comprises: a step of inputting data; a step of encoding the data input; a step of storing, in the storage means, encoded data generated in the step of encoding the data; and a step of multiplexing the encoded data stored in the storage means and transmitting the data multiplexed, to a predetermined receiving apparatus connected through a network. In the step of multiplexing the encoded data, a state of the network is input and a multiplexing rate is controlled in accordance with the state of the network, which has been input.

The other objects of this invention and the advantages attained by this invention will be more apparent from the embodiments of the invention, which will be described with reference to the accompanying drawings.

DETAILED DESCRIPTION

Best Mode For Carrying Out The Invention

Encoding/transmitting apparatuses according to the present invention will be described, with reference to the accompanying drawings. Any encoding/transmitting apparatus according to this invention encodes streaming data and outputs the data thus encoded to external apparatuses. It decodes images and sounds sequentially input and outputs them to the external apparatuses.

Figure 1:
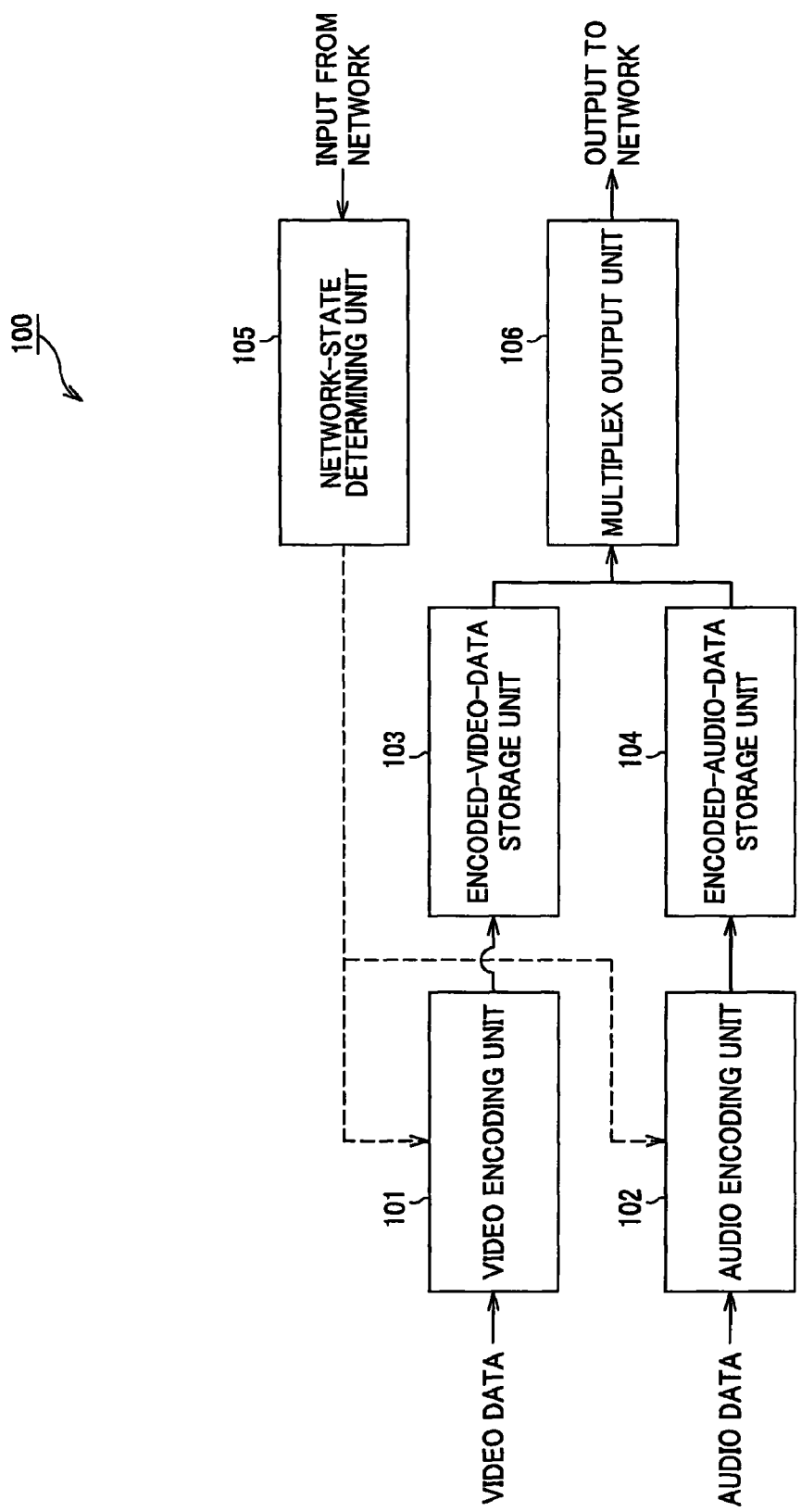
FIG. 1 is a block diagram showing a conventional encoding/transmitting apparatus.
Figure 2:
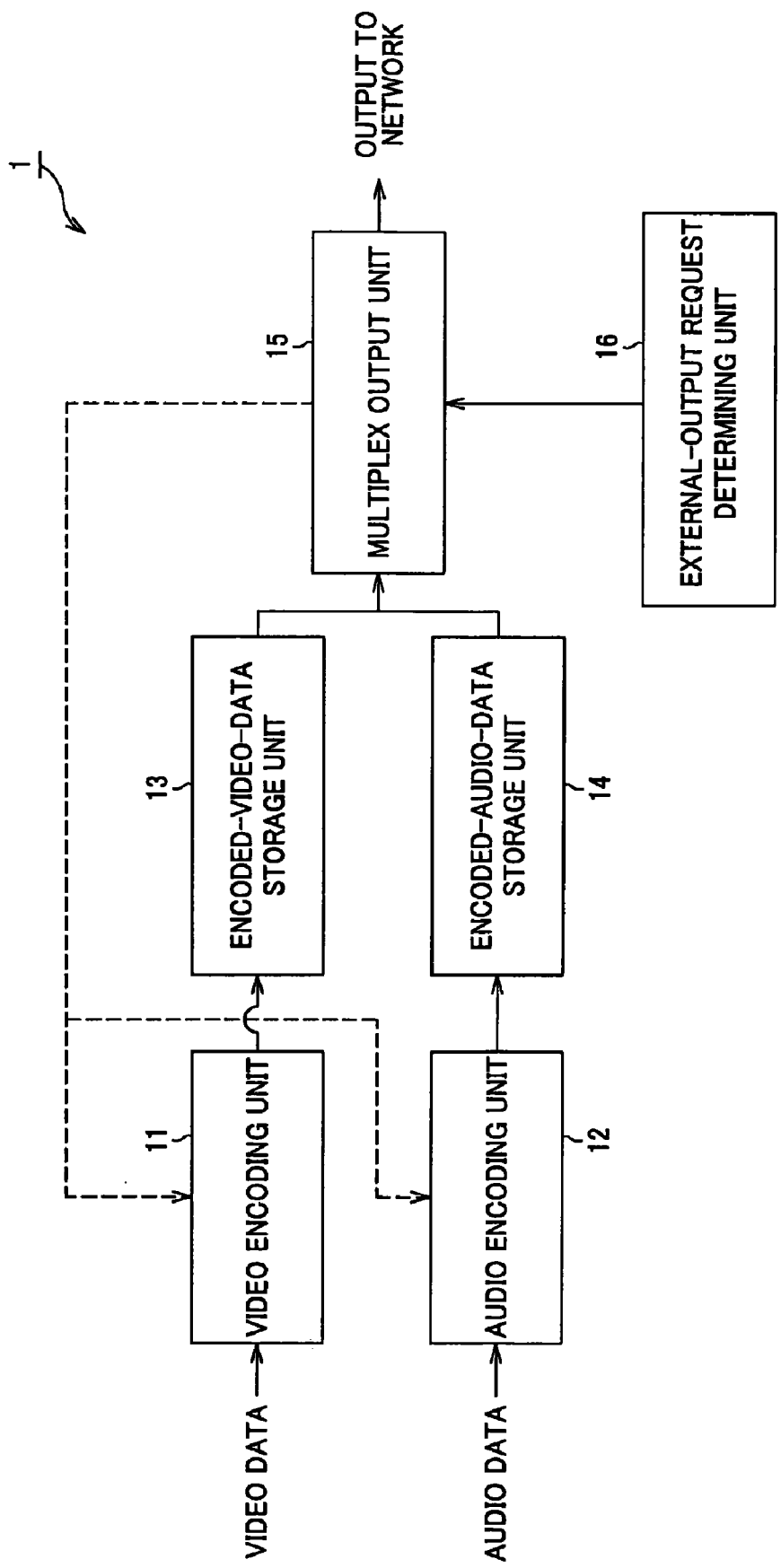
FIG. 2 is a block diagram showing an encoding/transmitting apparatus according to this invention.

As shown in FIG. 2, an encoding/transmitting apparatus 1 comprises a video encoding unit 11, an audio encoding unit 12, an encoded-video-data storage unit 13, an encoded-audio-data storage unit 14, a multiplex output unit 15, and an external-output request determining unit 16. The video encoding unit 11 encodes the input video data. The audio encoding unit 12 encodes the input audio data. The encoded-video-data storage unit 13 stores the video data encoded. The encoded-audio-data storage unit 14 stores the audio data encoded. The multiplex output unit 15 multiplexes the video data and the audio data, both encoded, and outputs them. The external-output request determining unit 16 monitors the network and determines whether an output request has been made.

Note that, in FIG. 2, the broken lines indicate the flow of data, and the solid lines indicate the flow of control signals.

Video data items, which are distributed in the form of a stream, are sequentially input to the video encoding unit 11. The video encoding unit 11 encodes the input video data in accordance with encoding rules such as the rules of MPEG-4 (Moving Picture Expert Group). The video data encoded by the video encoding unit 11 is stored in the encoded-video-data storage unit 13.

While encoding the video data, the video encoding unit 11 receives a multiplexing-completion signal from the multiplex output unit 15. The multiplexing-completion signal is a signal that the multiplex output unit 15 generates upon finishing the multiplexing. This signal contains information identifying the encoded data that has been multiplexed. The video encoding unit 11 releases the encoded video data from the encoded-video-data storage unit 13, on the basis of the information described in the multiplexing-completion information. The word "release" means a process of allowing other encoded data to be stored in the storage area that was occupied by any encoded data.

The video encoding unit 11 discriminates the encoded data read from the encoded-video-data storage unit 13 by the multiplex output unit 15, on the basis of the information described in the multiplexing-completion signal.

The video encoding unit 11 manages the data now stored in the encoded-video-data storage unit 13, in accordance with the encoded data thus discriminated. The unit 11 then determines the area that the data occupies in the encoded-video-data storage unit 13.

That is, the video encoding unit 11 calculates the area the encoded data occupies in the encoded-video-data storage unit 13, from the difference between the amount of encoded video data and the amount of the multiplexed, encoded video data.

The video encoding unit 11 temporarily stops encoding data or keeps encoding data, in accordance with how large or small an area that the encoded data occupies in the encoded-video-data storage unit 13.

Audio data items are sequentially input to the audio encoding unit 12. The audio encoding unit 12 encodes the input audio data in accordance with encoding rules such as the MPEG rules. The audio data encoded by the audio encoding unit 12 is stored in the encoded-audio-data storage unit 14. The audio encoding unit 12 receives the multiplexing-completion signal from the multiplex output unit 15. In accordance with the multiplexing-completion signal, the audio encoding unit 12 releases the multiplexed, encoded audio data from the encoded-audio-data storage unit 14.

The audio encoding unit 12 encodes the input audio data. It calculates the area the encoded data occupies in the encoded-audio-data storage unit 14 from the difference between the amount of encoded audio data and the amount of the multiplexed, encoded audio data. The audio encoding unit 12 temporarily stops encoding data or keeps encoding data, in accordance with how large or small an area that the encoded audio data occupies in the encoded-audio-data storage unit 14.

The multiplex output unit 15 reads the data from the encoded-video-data storage unit 13, and the data from the encoded-audio-data storage unit 14. The unit 15 multiplexes the encoded video data and the encoded audio data. The multiplexed data is output to the network. Upon finishing multiplexing the encoded video data and the encoded audio data, the multiplex output unit 15 generates a multiplexing-completion signal.

The multiplexing-completion signal is a signal that identifies the encoded video data that has been multiplexed. The video encoding unit 11 and the audio encoding unit 12 release the encoded video data and encoded audio data, which have been multiplexed, from memories such as the encoded-video-data storage unit 13 the encoded-audio-data storage unit 14, in accordance with the multiplexing-completion signal.

The external-output request determining unit 16 monitors the network. When the network assumes an undesirable state, the unit 16 outputs a multiplexing stop command, causing the multiplex output unit 15 to stop the multiplexing.

How the encoding/transmitting apparatus 1 that has the above-described configuration operates to output video data to the network will be described, with reference to FIGS. 3 to 5. In the following description, how the apparatus 1 transmits video data will be explained first, and how it transmits audio data will be explained next.

To transmit data, the video encoding unit 11, the multiplex output unit 15, and the multiplex-output request determining unit operate in parallel.

The operation of the video encoding unit 11 will be described first. The video encoding unit 11 encodes the video data input to it, generating encoded video data. The video encoding unit 11 outputs the encoded video data to the encoded-video-data storage unit 13. The encoded-video-data storage unit 13 stores the input video data items, one after another.

Every time the video encoding unit 11 encodes video data, it determines the area that the encoded data occupies in the encoded-video-data storage unit 13. Various methods are available, which the unit 11 may perform to determine this area. For example, the area is calculated from the difference between the amount of the encoded data and the amount of the multiplexed data.

Figure 3:
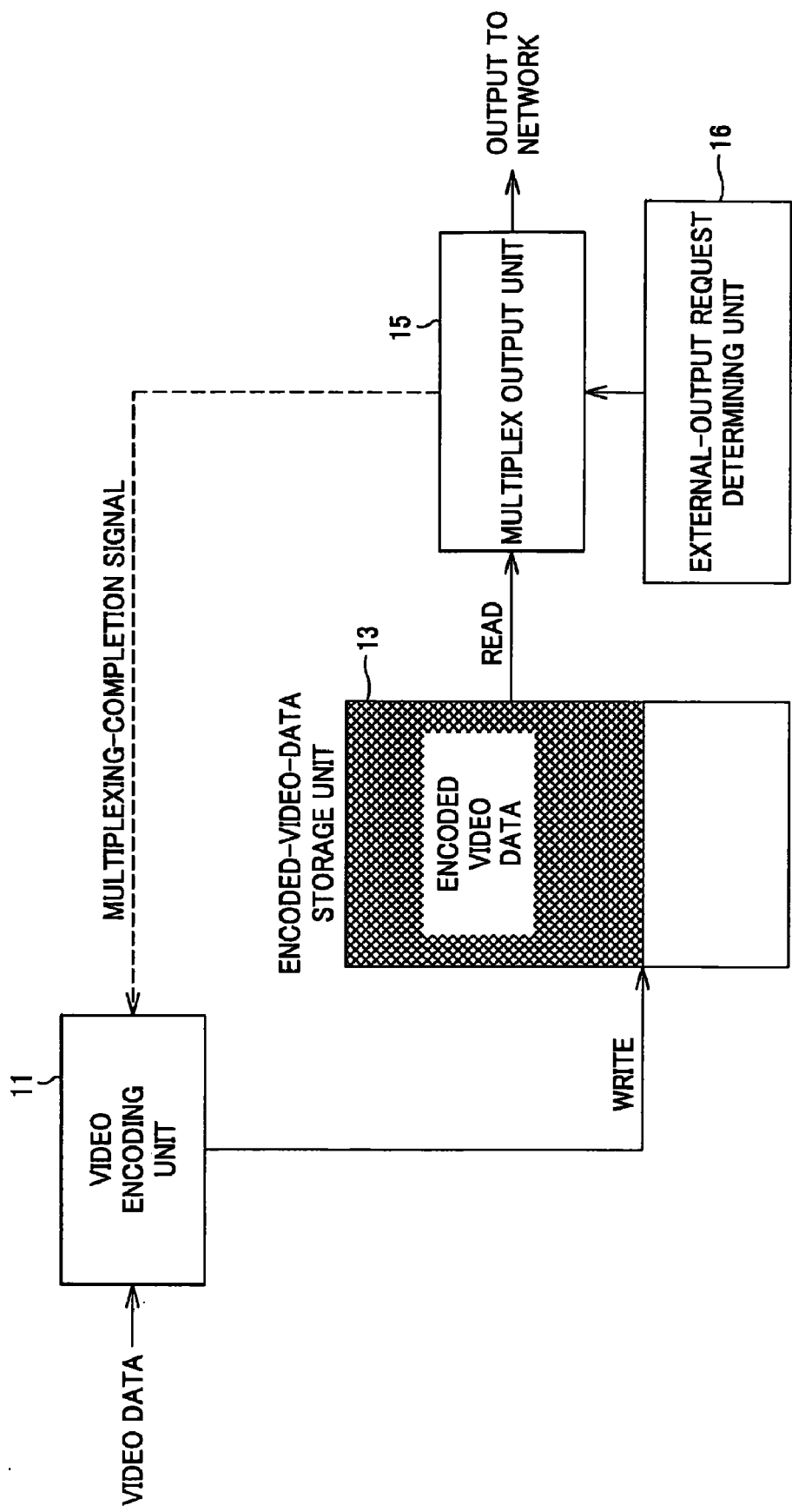
FIG. 3 is a diagram illustrating a state that encoded data occupies a small area in the encoded-video-data storage unit.

If the vacant area is large in the encoded-video-data storage unit 13 as is illustrated in FIG. 3, the video encoding unit 11 encodes the input video data. The encoded video data is accumulated in the encoded-video-data storage unit 13.

Figure 4:
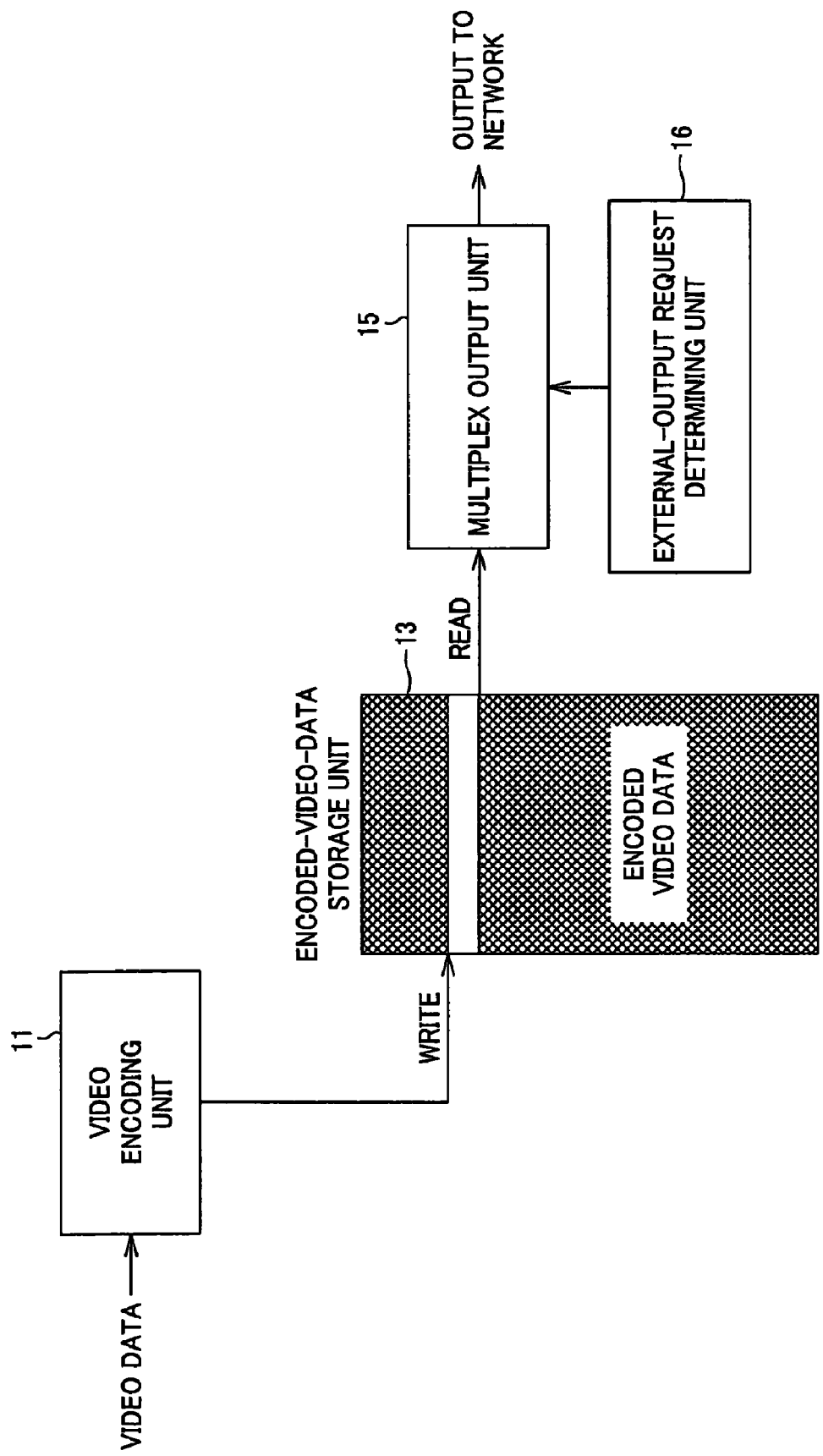
FIG. 4 is a diagram illustrating a state that encoded data occupies a large area in the encoded-video-data storage unit.

If the vacant area is small in the encoded-video-data storage unit 13 as is shown in FIG. 4, the video encoding unit 11 stops encoding the input video data. In this case, a part of the input video data is not encoded, and some frames of video data are not stored in the unit 13.

The operation of the multiplex output unit 15 will be described. The multiplex output unit 15 operates as the video encoding unit 11 encodes the input video data. The unit 15 multiplexes the data stored in the encoded-video-data storage unit 13, outputting multiplexed data to the network. Upon finishing multiplexing the encoded data, the multiplex output unit 15 outputs a multiplexing-completion signal to the video encoding unit 11. When the video encoding unit 11 receives the multiplexing-completion signal, it releases the multiplexed, encoded video data from the encoded-video-data storage unit 13.

As indicated above, the video encoding unit 11 encodes the input video data and the multiplex output unit 15 multiplexes the encoded video data and outputs the resultant multiplexed data to the network. The area that the encoded data occupies in the encoded-video-data storage unit 13 increases every time an item of encoded video data is stored into the unit 13, and decreases every time an item of encoded video data is released from the unit 13.

The operation of the external-output request determining unit 16 will be described. The determining unit 16 monitors the network as the video encoding unit 11 and the multiplex output unit 15 operate. When the network assumes an undesirable state, the unit 16 outputs a multiplexing stop command to the multiplex output unit 15.

Upon receiving the multiplexing stop command, the multiplex output unit 15 stops multiplexing data, in accordance with this command. The video encoding unit 11 keeps encoding the input video data even if the unit 15 stops multiplexing data. Hence, the encoded-video-data storage unit 13 accumulates the encoded video data. The video encoding unit 11 goes on encoding the input video data until the vacant storage area of the encoded-video-data storage unit 13 becomes very small. The unit 11 stops encoding the input video data when the vacant storage area becomes insufficient.

Figure 5A:
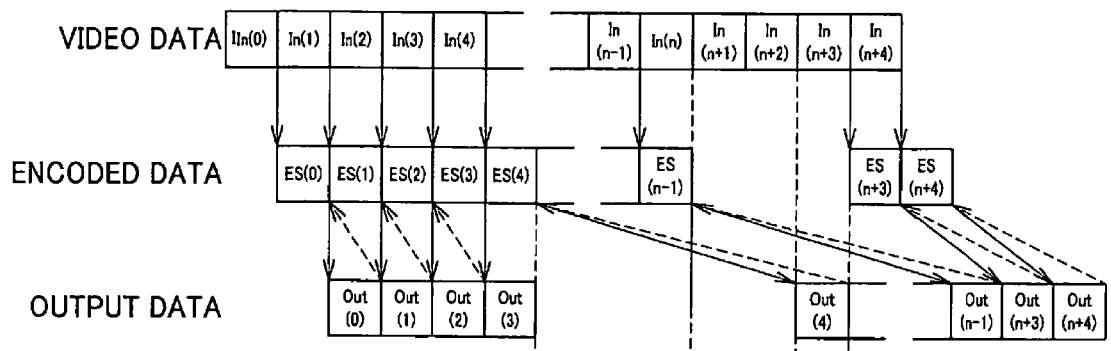
FIGS. 5A to 5C are charts explaining the operation of the encoding/transmitting apparatus.

The operation of the encoding/transmitting apparatus 1 will be described in greater detail, with reference to FIG. 5. FIG. 5 is charts explaining the operation of the encoding/transmitting apparatus 1. FIG. 5A represents the relation between the input video data, the encoded video data stored in the encoded-video-data storage unit 13 and the encoded video data output to the network. In FIG. 5A, In(i) is the input video data, ES(i) is the encoded video data, Out(i) is the encoded video data output (hereinafter referred to as "output data"). The suffix (i) put to the three types of data indicates that these data items are related to one another.

In FIG. 5A, the arrow directed from the video data In(i) to the encoded data Es(i) shows that the video data In(i) has been encoded into the data Es(i). Similarly, the arrow directed from the encoded data Es(i) to the output data Out(i) indicates that the encoded data Es(i) has been multiplexed, and the arrow directed from the output data Out(i) to the encoded data Es(i) indicates that a release request has been output for the area in which the encoded data Es(i) is stored.

Figure 5B:
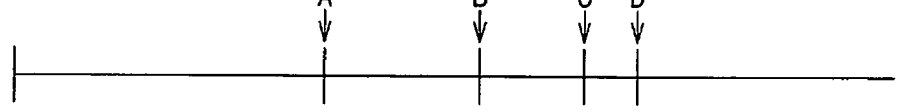

FIG. 5B is a chart showing when the times at which the state of the encoding/transmitting apparatus 1 changes. In FIG. 5B, point A indicates the time when a multiplexing stop command is output because the network has assumed an undesirable state. Point B indicates the time when the area that the encoded data occupies in the encoded-video-data storage unit 13 exceeds a predetermined value. Point C indicates the time when a multiplexing start command is output because the network has restored a good state. Point D indicates the time when the encoded data is released and the area that the encoded data occupies in the encoded-video-data storage unit 13 decreases below the predetermined value.

Figure 5C:
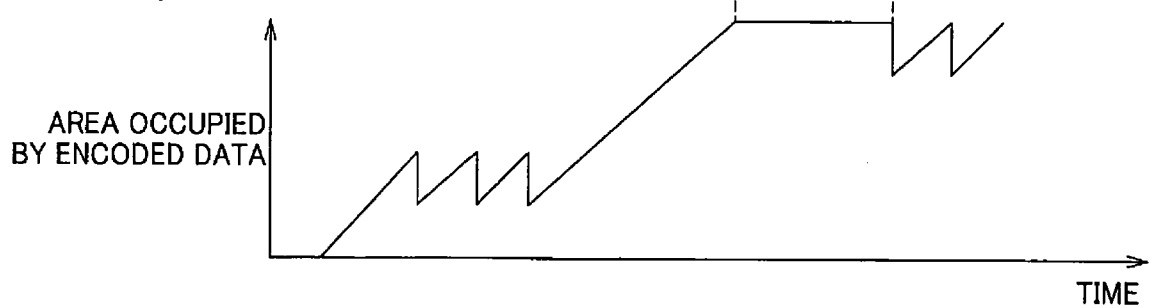

FIG. 5C is a chart illustrating how the area that the encoded data occupies in the encoded-video-data storage unit 13 changes with time. In this figure, time is plotted on the axis of abscissa, and the area occupied by the encoded data in the encoded-video-data storage unit 13 is plotted on the axis of ordinate.

The video data In(i) input will be explained first. The encoding/transmitting apparatus 1 according to this embodiment is an apparatus that transmits stream data. This is why video data items In(0), In(1), . . . , In(n+4) are input to the encoding/transmitting apparatus 1, one after another at a regular pace.

The video encoding unit 11 encodes the input video data items In(0), In(1), In(2), In(3), one by one, generating encoded video data items Es(0), Es(1), Es(2) and Es(3). The encoded video data items thus generated are stored in the encoded-video-data storage unit 13. The multiplex output unit 15 multiplexes the encoded video data items Es(0), Es(1), Es(2) and Es(3), generating output data items Out(0), Out(1), Out(2) and Out(3), which are output to the network.

Every time the multiplex output unit 15 multiplexes an encoded video data item, i.e., Es(0), Es(1), Es(2) or Es(3), the unit 15 generates a multiplexing-completion signal, which is output to the video encoding unit 11. In accordance with the multiplexing-completion signal, the video encoding unit 11 releases the multiplexed, encoded video data.

During this operation, the vacant area for storing data, which is available in the encoded-video-data storage unit 13, decreases every time a video data item is encoded, and increases every time en encoded video data item is multiplexed, as is illustrated in FIG. 5C. Since the encoding and the multiplexing are well balanced during the operation, the vacant storage area is stable.

At time A, the network assumes an undesirable state. Upon detecting that the network has assumed the undesirable state, the determining unit 16 outputs a multiplexing stop command to the multiplex output unit 15. In response to the multiplexing stop command, the multiplex output unit 15 stops multiplexing data.

Even after the multiplexing is stopped, video data items In(5), In(6), . . . , In (n−1) are sequentially input to the video encoding unit 11. The video encoding unit 11 encodes the video data items In(5), In(6), . . . , In (n−1) input to it, generating encoded video data items Es(5), ES(6), . . . , Es(n−1), even after the multiplexing is stopped.

The video encoding unit 11 calculates the area that the encoded data occupies in the encoded-video-data storage unit 13, before the encoded video data is stored in the unit 13. The unit 11 keeps encoding the input video data until the area that the encoded data occupies in the encoded-video-data storage unit 13 reaches the predetermined value. At this time, the multiplex output unit 15 is not operating. Hence, the area occupied by the encoded data only increases in the encoded-video-data storage unit 13.

The area that the encoded data occupies in the encoded-video-data storage unit 13 exceeds the predetermined value at time B. When the area occupied by the encoded data in the encoded-video-data storage unit 13 exceeds the predetermined value, the video encoding unit 11 stops encoding data.

The "predetermined value" is a storage capacity that is required to encode an image. This storage capacity is, for example, one for storing an I picture obtained by encoding a complicated image, or for storing video data encoded at low bit rate.

To change the encoding bit rate, the video encoding unit 11 carries out a rate control in accordance with the vacant area available in the encoded-video-data storage unit 13. As the vacant area increases, the unit 11 can raise the bit rate. This rate control makes it possible to distribute images, each missing no frames, though the image quality may decrease.

Even if the video encoding unit 11 stops encoding video data, it receives video data items In(n), In(n+1) and In(n+2) input to it. The video encoding unit 11 does not encode these input data item, nonetheless. The video data items In(n), In(n+1) and In(n+2) input to the unit 11 are, therefore, discarded.

When the network restores a good state at time C, the determining unit 16 outputs a multiplexing start command to the multiplex output unit 15. Upon receiving the multiplexing start command, the multiplex output unit 15 reads, from the encoded-video-data storage unit 13, the video data item Es(4) that has been first encoded, and multiplexes this video data item, generating output data Out(4). The output data Out(4) is smoothly transmitted to the network, because the network assumes a good state at this time.

Upon multiplexing the encoded video data item Es(4), the multiplex output unit 15 outputs a multiplexing-completion signal to the video encoding unit 11. In accordance with the multiplexing-completion signal, the video encoding unit 11 releases the encoded video data item Es(4) from the encoded-video-data storage unit 13.

When the encoded video data is released, the area that the encoded video data occupies decreases in the encoded-video-data storage unit 13. When the area occupied by the encoded video data decreases, the video encoding unit 11 starts performing encoding again, encoding the video data In(n+4) input next, thus generating an encoded video data item Es(n+4).

The multiplex output unit 15 multiplexes the encoded video data items Es(4), Es(5), ..., Es(n−1), in the order these data items have been generated. The encoded video data items, thus multiplexed, are output to the network. Every time an encoded video data item is multiplexed, the area occupied by encoded video data decreases in the encoded-video-data storage unit 13. Every time a video data item is encoded, the area increases. The encoding and the multiplexing are well balanced during the operation. Hence, the vacant storage area is stable.

In the encoding/transmitting apparatus 1 according to this invention, the external-output request determining unit 16 monitors the state of the network as described above. On the basis of what the unit 16 has determined, it is determined whether the process of transmitting data should be stopped or started again.

In the encoding/transmitting apparatus 1 according to this invention, the external-output request determining unit 16 that monitors the state of the network is not provided on the network. Even if no response comes from the communication party, the state of the network can be confirmed from the output of the external-output request determining unit the unit 16.

How video data is processed has been described above. Audio data is processed in almost the same way. The above description holds true of audio data, too, only if the video encoding unit 11 and the encoded-video-data storage unit 13 are taken for the audio encoding unit 12 and the encoded-audio-data storage unit 14, respectively. Thus, how audio data is processed will not be explained.

An encoding/transmitting apparatus 2, which is another embodiment of this invention, will be described. This apparatus 2 comprises a video encoding unit 21, an audio encoding unit 22, an encoded-video-data storage unit 23, an encoded-audio-data-storage unit 24, a multiplex output unit 25, an external-output request determining unit 26, and a filter 27 that is connected to the input of the audio encoding unit 22 as is illustrated in FIG. 6.

The filter 27 is a filter that causes sound to fade in and fade out.

The filter 27 is controlled by, for example, the audio encoding unit 22. How the audio encoding unit 22 controls the filter 27 will be described. As indicated above, every time the audio encoding unit 22 starts encoding audio data, it checks the area that encoded audio data occupies in the encoded-audio-data storage unit 24. If the area occupied by the encoded audio data is so large that audio data may no longer be encoded, the unit 22 controls the filter 27, causing the same to perform fading-out of the audio data to be encoded next. If the area occupied by the encoded audio data is so small that audio data may be encoded, the unit 22 controls the filter 27, achieving fading-in of the audio data to be encoded next.

Figure 6:
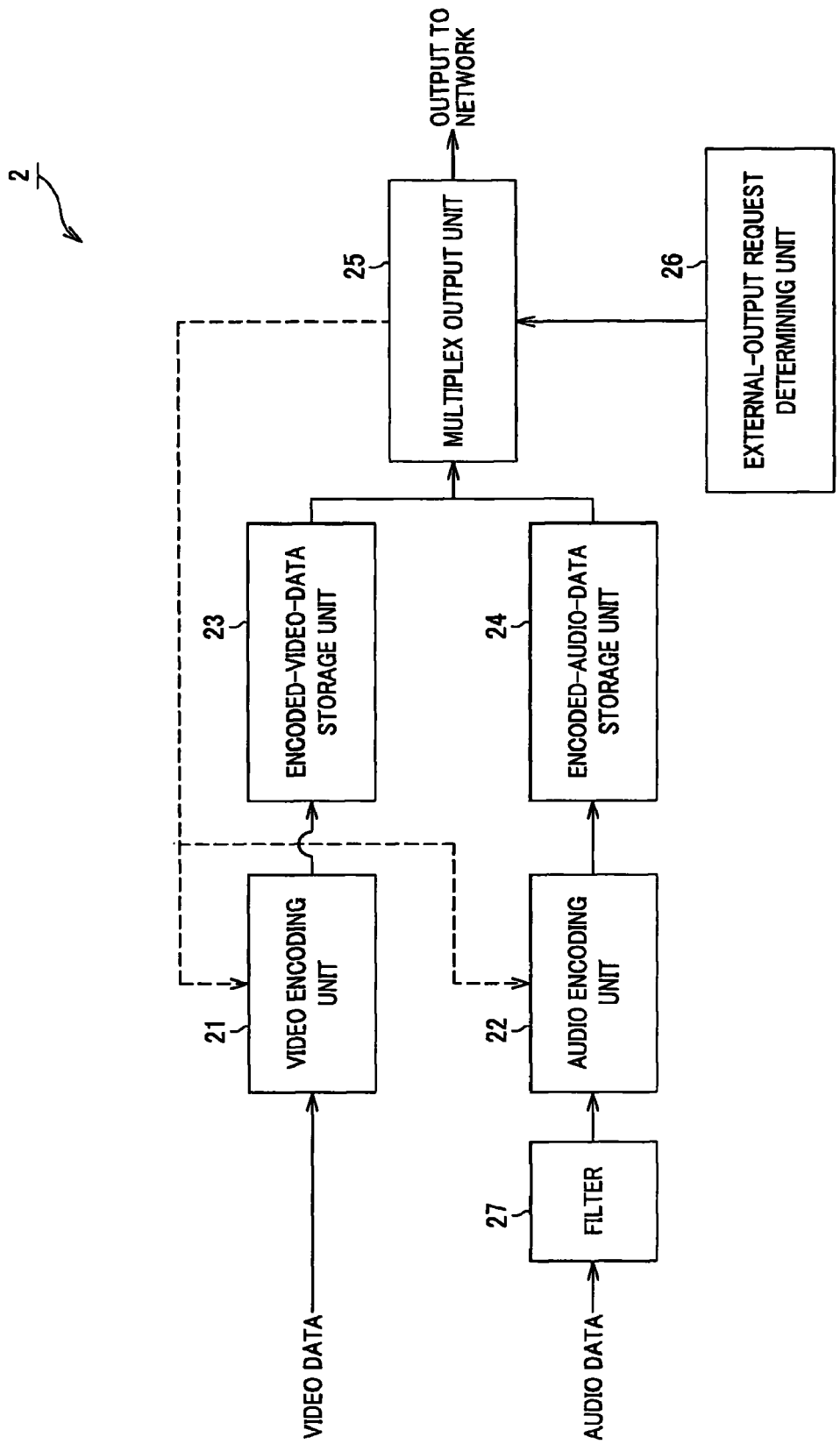
FIG. 6 is a block diagram depicting another encoding/transmitting apparatus according to this invention.

In FIG. 6, too, the broken lines indicate the flow of data, and the solid lines indicate the flow of control signals.

The encoding/transmitting apparatus shown in FIG. 6 has the filter 27 in order not to induce strangeness, which may otherwise result from frames missing in audio data. When the unit 22 stops encoding audio data, some frames of the audio data are lost. As a consequence, the sound becomes discontinuous. The filter 27 causes sound to fade in or out. Thus, each acoustic part smoothly reaches an acoustic part, and each an acoustic part smoothly reaches an acoustic part.

An encoding/transmitting apparatus 3, which is still another embodiment of this invention, will be described. This apparatus 3, which is shown in FIG. 7, comprises a video encoding unit 31, an audio encoding unit 32, an encoded-video-data storage unit 33, an encoded-audio-data-storage unit 34, an external-output request determining unit 36, and a multiplex output unit 35 that has a shaping function.

Figure 7:
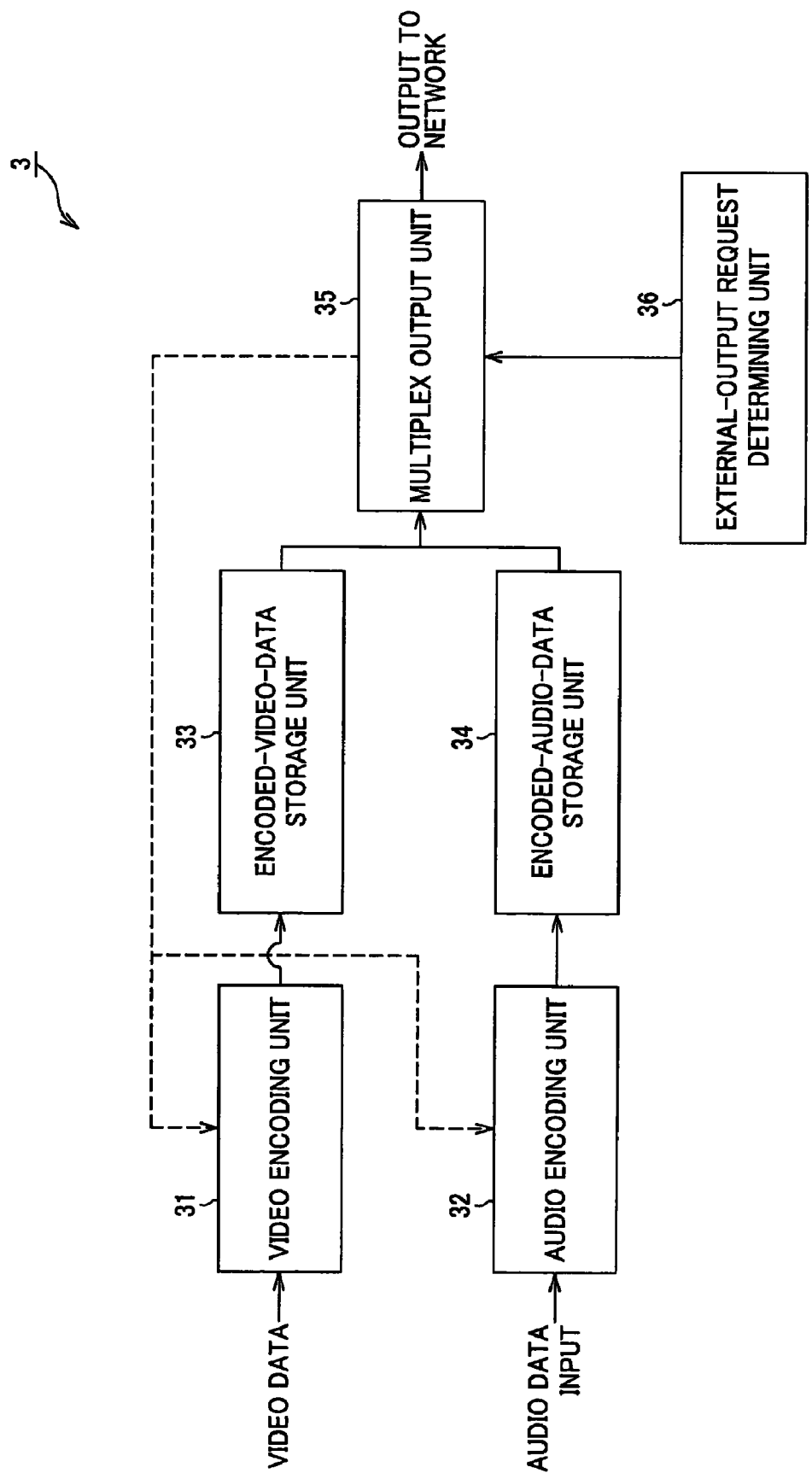
FIG. 7 is a block diagram showing still another encoding/transmitting apparatus according to the present invention.

In FIG. 7, too, the broken lines indicate the flow of data, and the solid lines indicate the flow of control signals.

Video data changes in amount, in depending on the complexity, motion and type of the image it represents and the type of encoded data. The shaping function is a function of outputting encoded data from the encoded-video-data storage unit to the network at a predetermined speed.

Assume that video data is encoded in accordance with the MPEG encoding rules. Then, the image is converted to an I picture, a B picture, or a P picture. The I picture is an image that is basic to the B picture and the P picture. The data representing an I picture is greater than the data representing a B picture or a P picture. The P picture is an image that is basic to the B picture. The data representing a P picture is greater than the data representing a B picture. Hence, the amount of encoded data changes, in accordance with the type of the picture it represents. The shaping function suppresses the change in the amount of data to be transmitted, which depends on the change in the amount of encoded data.

Figure 8A:
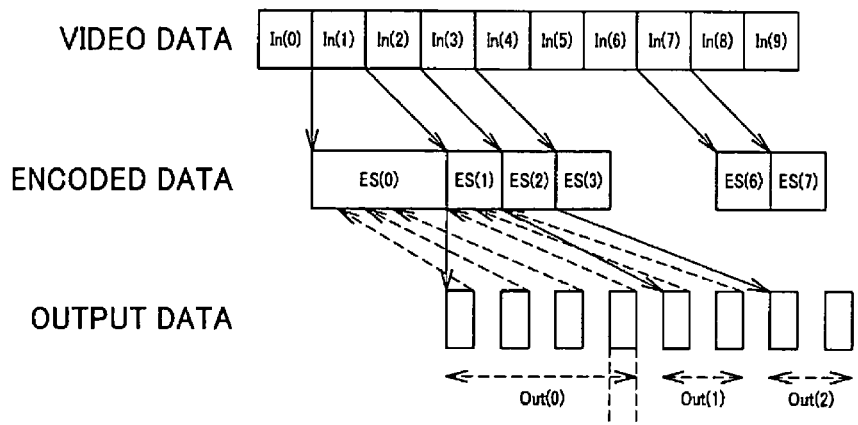
FIGS. 8A to 8C are charts explaining the operation of the encoding/transmitting apparatus shown in FIG. 7.

FIG. 8 is charts explaining how the encoding/transmitting apparatus 3 shown in FIG. 7 transmit data. In FIG. 8A, In(i) denotes the video data input, Es(i) indicates the video data encoded, and Out(i) denotes the video data to be output to the network, as in FIG. 5A.

Figure 8B:
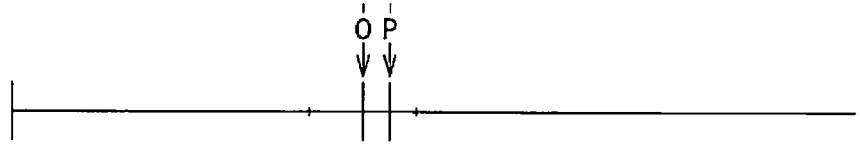

FIG. 8B is a chart showing when the times at which the state of the encoding/transmitting apparatus 3 changes. In FIG. 8B, point O indicates the time when the area that the encoded data occupies in the encoded-video-data storage unit 33 exceeds a predetermined value. Pont P indicates the time when the encoded data is released due to multiplexing and the area occupied by the encoded data decreases below a predetermined value.

Figure 8C:
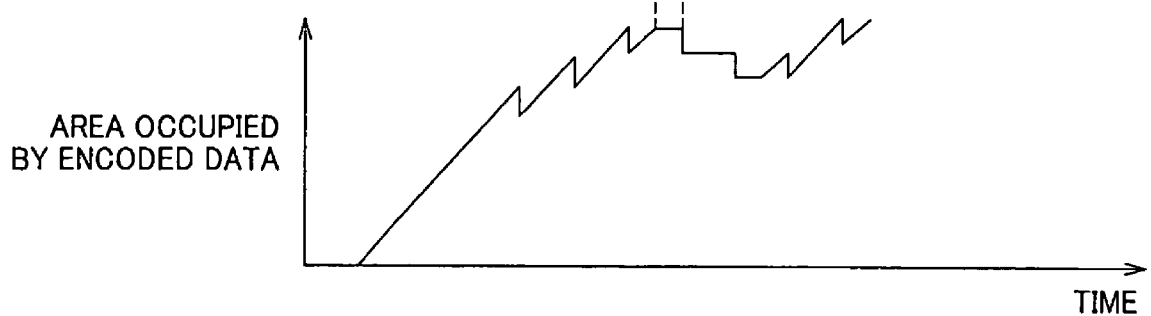

FIG. 8C is a chart illustrating how the area occupied by the encoded data in the encoded-video-data storage unit 33 changes with time. In this figure, time is plotted on the axis of abscissa, and the area occupied by the encoded data in the encoded-video-data storage unit 33 is plotted on the axis of ordinate.

How the encoding/transmitting apparatus 3 transmits data will be described, with reference to FIG. 8. The encoding/transmitting apparatus 3 is an apparatus that encodes streaming data and transmits the data thus encoded to external apparatuses. This is why video data items In(0), In(1), In(2), ... are input to the encoding/transmitting apparatus 3, one after another.

The video encoding unit 31 encodes the input video data items In(0), In(1), In(2), ..., one by one. The video data item In(0) input first is converted to encoded video data item Es(0). The encoded video data item Es(0) represents an I picture and is large in amount.

The video encoding unit 31 then converts the video data item In(1) input next, to an encoded video data item Es(1). This encoded video data item Es(1) represents a P picture or a B picture. It is smaller in amount than the encoded video data item Es(0) first generated.

The multiplex output unit 35 stores data representing the maximum transmission amount in which data can be transmitted. The unit 35 reads encoded video data from the encoded-video-data storage unit 33, so that the amount of data read may not exceed the maximum transmission amount. The multiplex output unit 35 divides the encoded video data read from the unit 33, into blocks of an appropriate size and multiplexes the data blocks. The data blocks are output to the network.

As described above, the encoded video data items Es(0), Es(1), Es(2), ... differ in amount. The multiplex output unit 35 divides the encoded video data into blocks of an appropriate size. More precisely, the unit 35 divides the video data item Es(0) into four blocks, and Es(1) and Es(2) each into two blocks and multiplexes these blocks, generating multiplex data. The multiplexed data is output to the network.

Thus, the data item Es(0) is divided into a plurality of blocks, which are sequentially transmitted. The timing of encoding the video data and the timing of transmitting the encoded video data therefore differ from each other.

In the instance of FIG. 8, Es(1), Es(2) and Es(3) have been encoded at the time Es(0) is transmitted in its entirety. Es(1), Es(2) and Es(3) are stored in the encoded-video-data storage unit 33. The encoded data is transmitted at a constant rate. Hence, if the encoded video data is large in amount, the following encoded video data will be accumulated in the encoded-video-data storage unit 33 before the video data is transmitted. At time O, the area occupied by the encoded data in the encoded-video-data storage unit 33 inevitably exceeds the predetermined value.

When the area occupied by the encoded data exceeds the predetermined value, the video encoding unit 31 stops encoding video data. The video data items In(4) and In(5), both input after time O, are therefore discarded, without being encoded.

The multiplex output unit 35 keeps multiplexing the encoded video data and output it to the network, even while the video encoding unit 31 is encoding no data. The multiplex output unit 31 divides the encoded video data into blocks and outputs the blocks, one by one, to the network. Every time the multiplex output unit 35 outputs a block, it outputs a multiplexing-completion signal to the video encoding unit 31.

When the video encoding unit 31 receives the multiplexing/completion signal, it releases the encoded video data from the encoded-video-data storage unit. Every time the video encoding unit 31 receives a video data item, it checks the area that encoded audio data occupies. In the case shown in FIG. 8, the area occupied by the encoded data becomes smaller than the predetermined value at time P. Then, the encoding is started again.

The video encoding unit 31 encodes the video data items In(7), In(8), ..., one after another, generating encoded video data items Es(7), Es(8), .... The encoded video data items Es(7), Es(8), ... are stored in the encoded-video-data storage unit 33. The multiplex output unit 35 divides the encoded video data items Es(7), Es(8), ..., each into blocks. The blocks are output to the network. Every time the multiplex output unit 35 multiplexes a block, it generates a multiplexing-completion signal to the video encoding unit 31. If the network assumes an undesirable state, the external-output request determining unit 36 outputs a multiplexing stop command to the multiplex output unit 35. The unit 36 therefore causes the multiplex output unit 35 to stop multiplexing data.

In the encoding/transmitting apparatus 3 that has a shaping function, the encoding process is thus controlled. With the encoding/transmitting apparatus 3 that has a shaping function, it is possible to control the amount in which the data is transmitted. In addition, it is possible to control the frame rate if the network assumes an undesirable state.

How video data is processed in the apparatus shown in FIG. 7 has been described above. Audio data is processed in almost the same way. To prevent the amount of data to transmit from exceeding the maximum transmission amount, the multiplex output unit may perform a shaping process and two controls. In the shaping process, it divides audio data into blocks. In the first control, it stops multiplexing data, when it receives a multiplexing stop command from the external-output request determining unit. In the second control, it causes the audio encoding unit to stop encoding audio data when the storage capacity of the encoded-audio-data storage unit becomes decreases too much.

Figure 9:
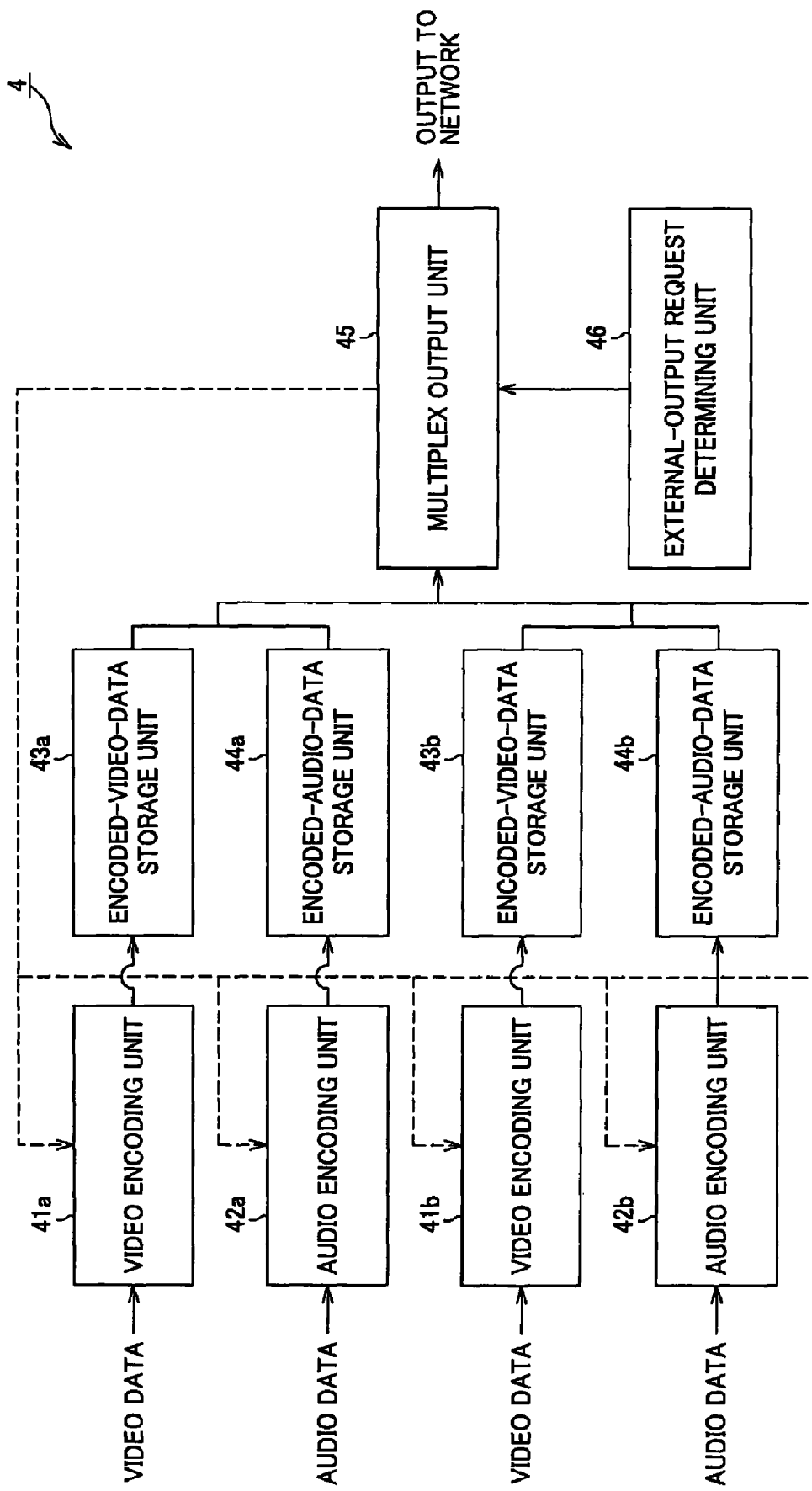
FIG. 9 is a block diagram depicting another encoding/transmitting apparatus according to the present invention.

An encoding/transmitting apparatus 4, which is a further embodiment of this invention, will be described. As shown in FIG. 9, this apparatus 4 outputs stream data that contains a plurality of programs. The encoding/transmitting apparatus 4 comprises a multiplex output unit 45 and an external-output request determining unit 46, and as many video encoding units 41 as the programs, as many audio encoding units 42 as the programs, as many encoded-video-data storage units 43 as the programs, and as many encoded-audio-data-storage units 44 as the programs.

In FIG. 9, too, the broken lines indicate the flow of data, and the solid lines indicate the flow of control signals.

The video data and audio data of a certain program are output to the video encoding unit 41 and audio encoding unit 42 that correspond to the program. The multiplex output unit 45 is connected to all video encoding units 41 and all audio encoding units 42. The multiplex output unit 45 multiplexes the encoded video data items read from the video encoding units 41 and the encoded audio data items read from the audio encoding units 42, generating one stream data item.

In the encoding/transmitting apparatus 4 shown in FIG. 9, video encoding units 41, audio encoding units 42, encoded-video-data storage units 43 and encoded-audio-data storage units 44 operate almost in the same way as their counterparts provided in the encoding/transmitting apparatus 4 according to the first embodiment. However, the multiplex output unit 45 performs an operation that differs from the operation that its counterpart does in the encoding/transmitting apparatus 4 according to the first embodiment.

To be more specific, when the multiplex output unit 45 multiplexes the data items read from the encoded-video-data storage units 43 and encoded-audio-data storage unit 44, it records as to which encoded video data item has been read from which encoded-video-data storage unit 43, and which encoded audio data item has been read from which encoded-audio-data storage unit 44. The multiplex output unit 45 outputs a multiplexing-completion signal to the video encoding unit 41 and audio encoding unit 42 that correspond to the program, the data about which data has been read.

The multiplex output unit 45 may have a shaping function, as in the encoding/transmitting apparatus 4 according to the second embodiment. Thus, the unit 45 may divide the data stored in each encoded-video-data storage unit 43 and each encoded-audio-data storage unit 44 into blocks, and may output data in an amount not exceeding a predetermined amount.

In the encoding/transmitting apparatus 4 shown in FIG. 9, the multiplexed output contains data showing which data about which program has been multiplexed, a multiplexing-completion signal is output to the video encoding unit 41 and audio encoding unit 42 that correspond to the program. Thus, this invention can be applied to the encoding/transmitting apparatus 4, too, which distributes stream data containing a plurality of programs.

As has been described, encoding/transmitting apparatuses according to the present invention have an external-output request determining unit that determines the state of the network. Hence, the apparatuses can detect the state of the network even if no responses come from the communication party. The apparatus can therefore accomplish an appropriate rate control.

This invention can be applied to encoding/transmitting apparatuses that have shaping function or encoding/transmitting apparatuses that have a plurality of programs, too.

The present invention is not limited to the embodiments described above. Various changes and modifications that include the gist of the invention should be considered to be fall within the scope and spirit of the invention. For example, each encoding/transmitting apparatus described above is configured to output stream data. The output data is not limited to stream data, nevertheless. Any encoding/transmitting apparatus that outputs data composed of images temporarily stored in an encoded data storage unit should be considered to fall within the scope of this invention.

The multiplex output unit is designed to stop multiplexing data when the network assumes an undesirable state. Instead, the multiplexing bit rate may be controlled, either raised or lowered, in accordance with the state of the network.

In the embodiments described above, the video encoding unit and the audio encoding unit stop encoding data when the area occupied by encoded data increases too much. Nonetheless, the video encoding unit and the audio encoding unit may be controlled to raise or lower the encoding bit rate.

INDUSTRIAL APPLICABILITY

In the present invention, the monitoring means for monitoring the state of the network is incorporated, as described above, in an encoding/transmitting apparatus. Data transmission can therefore be controlled even if no data showing the receipt of data comes from the communication party. Further, the data transmission can be controlled in real time, without waiting for the data coming from the communication party and indicating the receipt of data. Moreover, the load on the network can be reduced because the data transmission can be controlled, without receiving data via the network. In addition, the encoding means receives transmission signals directly from the multiplexing means and can therefore determine the state of the storage means.

The invention claimed is:

1. An encoding/transmitting apparatus, comprising:
input means for inputting data;
encoding means for encoding the inputted data;
storage means for storing the encoded data;
multiplexing means for multiplexing the encoded data stored in the storage means, for transmitting the multiplexed data to a predetermined receiving apparatus through a network, and for generating a multiplexing-completion signal that includes information identifying the encoded data that was multiplexed by the multiplexing means; and
monitoring means for monitoring a state of the network,
in which the multiplexing means controls a bit rate of the multiplexing in accordance with the state of the network, and
in which the encoding means calculates based on the multiplexing-completion signal an area occupied by the encoded data in the storage means, releases the area occupied by the encoded data, and controls a bit rate of the encoding of further data inputted by the input means based on the area that was occupied by the encoded data.

2. The encoding/transmitting apparatus according to claim 1, wherein the encoding means stops the encoding when the area occupied in the storage means by the encoded data is larger than a predetermined value, and carries out the encoding when the area occupied by the data in the storage means is smaller than the predetermined value.

3. The encoding/transmitting apparatus according to claim 2, wherein the inputted data includes audio data, and the encoding/transmitting apparatus further comprises audio-data output control means for fading-out the inputted audio data before the encoding is stopped, and for fading-in of the inputted audio data when the encoding is again started.

4. The encoding/transmitting apparatus according to claim 1, further comprising data-transmission-amount control means for storing and controlling an amount in which the multiplexing means can transmit data.

5. The encoding/transmitting apparatus according to claim 1, wherein the data includes a plurality of program data items, the encoding means encodes the program data items, independently of each other, the storage means stores the encoded program data items, independently of each other, and the multiplexing means multiplexes the encoded program data items, generating one output data item.

6. An encoding/transmitting method, comprising:
inputting data;
encoding the inputted data;
storing, in a storage unit, the encoded data; and
multiplexing the encoded data stored in the storage unit by use of a multiplexing unit, transmitting the multiplexed, encoded data, to a predetermined receiving apparatus through a network, and generating a multiplexing-completion signal that includes information identifying the multiplexed, encoded data;
monitoring a state of the network,
controlling a bit rate of the multiplexing in accordance with the state of the network;
calculating an area occupied by the encoded data in the storage unit based on the multiplexing-completion signal, releasing the area occupied by the encoded data, and
controlling a bit rate of the encoding of further inputted data based on the area that was occupied by the encoded data.

7. The encoding/transmitting method according to claim 6, wherein the encoding is stopped when the area occupied in the storage unit by the encoded data is larger than a predetermined value, and the encoding is again started when the area occupied by the data in the storage unit is smaller than the predetermined value.

8. The encoding/transmitting method according to claim 7, wherein the inputted data includes audio data, and the encoding/transmitting method further comprises fading-out the inputted audio data before the encoding is stopped, and fading-in of the inputted audio data when the encoding is again started.

9. The encoding/transmitting method according to claim 6, wherein the data includes a plurality of program data items, the program data items are encoded, independently of each other, in the step of encoding the data, the encoded program data items are stored in the storage unit, independently of each other, in the step of storing the encoded data, and the program data items are multiplexed in the step of multiplexing the encoded data, thereby generating one output data item.

10. An encoding/transmitting apparatus, comprising:
an encoding unit that encodes received data;
a storage unit that stores the encoded data;
a multiplexing unit that multiplexes the encoded data received from the storage unit to produce multiplexed data, that transmits the multiplexed data to a predetermined receiving apparatus through a network, and that generates a multiplexing-completion signal that includes information identifying the encoded data that was multiplexed by the multiplexing unit; and
a determining unit that monitors a state of the network,
in which the multiplexing unit controls a bit rate of the multiplexing in accordance with the state of the network, and
in which the encoding unit calculates based on the multiplexing-completion signal an area occupied by the encoded data in the storage unit, releases the area occupied by the encoded data, and controls a bit rate of the encoding of further received data based on the area that was occupied by the encoded data.

11. The encoding/transmitting apparatus according to claim 10, wherein the encoding unit stops the encoding when the area occupied in the storage unit by the encoded data is larger than a predetermined value, and carries out the encoding when the area occupied by the data in the storage means is smaller than the predetermined value.

12. The encoding/transmitting apparatus according to claim 11, wherein the inputted data includes audio data, and the encoding/transmitting apparatus further comprises an audio-data output control unit that fades-out the inputted audio data before the encoding is stopped, and that fades-in of the inputted audio data when the encoding is again started.

13. An encoding/transmitting apparatus, comprising:
an encoding unit to encode received data that includes video data;
a storage unit to store encoded data encoded by the encoding unit;
a multiplex unit to multiplex the encoded data received from the storage unit so as to produce multiplex data and transmit the multiplexed data to a predetermined receiving apparatus through a network; and
a determining unit to monitor a state of the network, and generate a stop command and supply the stop command to the multiplex unit when the state of the network is undesirable,
in which the encoding unit stops an encoding process when an area occupied by data in the storage unit is larger than a predetermined value, and performs the encoding process when the area occupied by the data in the storage unit is smaller than the predetermined value,
in which the multiplex unit stops multiplexing in response to the stop command, and
in which, when the multiplex unit stops multiplexing in response to the stop command, the encoding unit continues the encoding process until the area occupied by data in the storage unit is larger than a predetermined value,
wherein the encoding unit encodes received data that includes audio data and the video data, and the encoding/transmitting apparatus further comprises an audio-data output control unit to fade-out or fade-in the audio data before the audio data is received by the encoding unit, in which the encoding unit controls the audio-data output control unit to fade-out the audio data to be encoded and then stops an encoding process when an area occupied by data in the storage unit is larger than a predetermined value, and controls the audio-data output control unit to fade-in the audio data to be encoded and then performs the encoding process when the area occupied by the data in the storage unit is smaller than the predetermined value.

14. An encoding/transmitting apparatus, comprising:
input means for inputting data that includes video data;
encoding means for encoding the data input by the input means;
storage means for storing encoded data generated by the encoding means;
multiplexing means for multiplexing the encoded data stored in the storage means and transmitting the multiplexed data to a predetermined receiving apparatus through a network; and
monitoring means for monitoring a state of the network, and for generating a stop command and supplying the stop command to the multiplexing means when the state of the network is undesirable,
in which the encoding means stops an encoding process when an area occupied by data in the storage means is larger than a predetermined value, and performs the encoding process when the area occupied by the data in the storage means is smaller than the predetermined value,
in which the multiplexing means stops multiplexing in response to the stop command, and
in which, when the multiplexing means stops multiplexing in response to the stop command, the encoding means continues the encoding process until the area occupied by data in the storage means is larger than a predetermined value,
wherein the input means inputs data that includes audio data, and the encoding/transmitting apparatus further comprises audio-data output control means for fading-out or fading-in the audio data before the audio data is received by the encoding means, in which the encoding means controls the audio-data output control means to fade-out the audio data to be encoded and then stops an encoding process when an area occupied by data in the storage means is larger than a predetermined value, and the encoding means controls the audio-data output control means to fade-in the audio data to be encoded and then performs the encoding process when the area occupied by the data in the storage means is smaller than the predetermined value.

15. An encoding/transmitting method, comprising:
inputting data that includes video data;
encoding the data input in the step of inputting;
storing, in storage unit, encoded data generated in the step of encoding the data; and
multiplexing the encoded data stored in the storage unit by use of a multiplexing unit and transmitting the multiplexed data, to a predetermined receiving apparatus through a network; and
monitoring a state of the network, and generating a stop command and supplying the stop command to the multiplexing unit when the state of the network is undesirable,
in which the encoding stops when an area occupied by data in the storage unit is larger than a predetermined value, and the encoding is performed when the area occupied by the data in the storage unit is smaller than the predetermined value,
in which the multiplexing stops in response to the stop command, and
in which, when the multiplexing stops in response to the stop command, the encoding continues until the area occupied by data in the storage unit is larger than a predetermined value,
wherein a step of fading-out the audio data to be encoded is carried out and then the encoding stops when an area occupied by the data in the storage unit is larger than a predetermined value, and a step of fading-in the audio data to be encoded is carried out and then the encoding is performed when the area occupied by the data in the storage unit is smaller than the predetermined value.

* * * * *